US011921285B2

(12) United States Patent
Koshel et al.

(10) Patent No.: US 11,921,285 B2
(45) Date of Patent: Mar. 5, 2024

(54) ON-CHIP SIGNAL PROCESSING METHOD AND PIXEL-ARRAY SIGNAL (71) Applicant: ARIZONA BOARD OF REGENTS ON BEHALF OF THE UNIVERSITY OF ARIZONA, Tucson, AZ (US)

(72) Inventors: John Koshel, Tucson, AZ (US); Emma Landsiedel, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 149 days.

(21) Appl. No.: 17/594,457

(22) PCT Filed: Apr. 19, 2020

(86) PCT No.: PCT/US2020/028896
§ 371 (c)(1),
(2) Date: Oct. 18, 2021

(87) PCT Pub. No.: WO2020/215046
PCT Pub. Date: Oct. 22, 2020

(65) Prior Publication Data
US 2022/0206293 A1 Jun. 30, 2022

Related U.S. Application Data (60) Provisional application No. 62/836,431, filed on Apr. 19, 2019.

(51) Int. Cl.
H04N 23/959 (2023.01)
G01B 9/02 (2022.01)
(Continued)

(52) U.S. Cl.
CPC .......... *G02B 27/0075* (2013.01); *G01B 9/02* (2013.01); *G01B 11/2441* (2013.01); *G01J 3/26* (2013.01);
(Continued)

(58) Field of Classification Search
None
See application file for complete search history.

(56) References Cited

U.S. PATENT DOCUMENTS 8,780,334 B1 * 7/2014 De Groot ........... G01B 9/02076
356/28.5
9,282,304 B1 * 3/2016 Schmit .................. H04N 23/88
(Continued)

OTHER PUBLICATIONS

PCT Application No. PCT/US2020/028901, International Search Report and Written Opinion, dated Sep. 17, 2020, 12 pages.
(Continued)

*Primary Examiner* — Twyler L Haskins
*Assistant Examiner* — Wesley J Chiu
(74) *Attorney, Agent, or Firm* — Cozen O'Connor (57) ABSTRACT Method and system for on-chip processing to obtain an EDOF image combines interferometry and imaging so the two operations do not interfere with one another but, rather, work together to create an in-focus, true color image of a three-dimensional object. This image has no significant artifacts and requires only limited processing. In addition, a coarse depth map is created in the process which may also be helpful in subsequent usage of the acquired image. A CMOS pixel-array sensor includes circuitry to implement processing at the pixel level.

15 Claims, 8 Drawing Sheets

(51) Int. Cl.
  *G01B 11/24* (2006.01)
  *G01J 3/26* (2006.01)
  *G01J 3/45* (2006.01)
  *G02B 27/00* (2006.01)
  *H04N 23/56* (2023.01)
  *H04N 23/67* (2023.01)

(52) U.S. Cl.
  CPC ............... *G01J 3/45* (2013.01); *H04N 23/56* (2023.01); *H04N 23/67* (2023.01); *H04N 23/959* (2023.01)

(56) References Cited

U.S. PATENT DOCUMENTS

| | | | |
|---|---|---|---|
| 2005/0259265 A1* | 11/2005 | De Lega | G01N 21/45 356/497 |
| 2006/0285122 A1* | 12/2006 | Bankhead | G01B 11/2441 356/497 |
| 2008/0215271 A1* | 9/2008 | Bankhead | G01B 11/026 356/521 |
| 2010/0053415 A1 | 3/2010 | Yun | |
| 2010/0128283 A1 | 5/2010 | Liesener et al. | |
| 2012/0007977 A1 | 1/2012 | Yamamoto et al. | |
| 2013/0215299 A1 | 8/2013 | Imamura | |
| 2013/0321581 A1 | 12/2013 | El-Ghoroury et al. | |
| 2014/0125776 A1 | 5/2014 | Damaskinos et al. | |
| 2014/0146325 A1 | 5/2014 | Tabuchi | |
| 2014/0168660 A1* | 6/2014 | Yan | G01B 9/02064 356/511 |
| 2014/0226150 A1* | 8/2014 | Colonna de Lega | G01B 9/02087 356/73 |
| 2015/0192769 A1* | 7/2015 | Dresel | G01B 9/02085 356/450 |
| 2015/0326772 A1 | 11/2015 | Kazami | |
| 2017/0126950 A1 | 5/2017 | Sarkar et al. | |
| 2017/0352152 A1 | 12/2017 | Satish et al. | |
| 2017/0363741 A1 | 12/2017 | Send et al. | |
| 2018/0316871 A1 | 11/2018 | Yoshino | |
| 2018/0352199 A1 | 12/2018 | Hwang et al. | |
| 2019/0137265 A1* | 5/2019 | Boulanger | G01B 11/2441 |
| 2021/0203907 A1* | 7/2021 | Murase | G01B 9/02 |
| 2022/0210321 A1* | 6/2022 | Koshel | H04N 23/676 |

OTHER PUBLICATIONS

U.S. Appl. No. 17/594,458 Notice of Allowance dated Oct. 12, 2023, 9 pages.

* cited by examiner

ON-CHIP SIGNAL PROCESSING METHOD AND PIXEL-ARRAY SIGNAL

CROSS-REFERENCE TO RELATED APPLICATIONS

The present application claims priority to U.S. Provisional Patent Application No. 62/836,431 filed Apr. 19, 2019 titled ON-CHIP SIGNAL PROCESSING METHOD AND ASSOCIATED PIXEL-ARRAY SENSOR, the contents of which are incorporated herein by reference in their entirety.

BACKGROUND

Extended depth of field (EDOF) systems are used to produce two-dimensional, in-focus, high resolution images of three-dimensional objects. Generally, EDOF systems need the ability to capture small details at all heights of the object. One use of EDOF systems is diagnosing flaws in a manufacturing environment which means they need to acquire and process images at a high speed.

Current EDOF technologies often use many images and significant post-processing to create a fully in-focus image. While these systems may be easy to implement and use, they are also slow and require tradeoffs in performance. Some of the prior art systems that attempt to overcome the tradeoff between resolution and depth of field include plenoptic cameras, image compression techniques, phase masking and various scanning devices such as simultaneous temporal imagers, confocal microscopes and interferometers. None of these systems are completely successful in that they may be limited by artifacts, may require significant post-processing, operate slowly, or be unable to collect true color images.

Interferometry is a technique for extracting information about an object by using light reflecting off the object. Generally, interferometers split a single light source into two different optical paths which, when recombined, interfere with each other to form fringes. These interference fringes give information about the object. Light sources used in an interferometer may have different bandwidths and coherence lengths, depending on the system and what types of objects are being measured. Coherent interferometric methods using a nearly monochromatic laser offer high quality results for surfaces with small, slow changes, such as curvatures of mirrors however, this method is not well-suited to measure surfaces that have high slopes or sharp edges.

Incoherent interferometric methods—also called white light interferometry—use light sources with broad wavebands to measure surfaces. Using low coherence sources allows surfaces with sharp edges, high slopes, and irregular features to be measured. White light interferometers (WLI) scan vertically and produce fringes only when close to best focus, allowing focus to be found across the object. Prior art WLI systems provide two-dimensional slices which are combined or otherwise processed to achieve a single in-focus image, which can be slow. In addition, WLI may also be used to acquire true color images since a white light is used as the source and color may be extracted from the fringes however, this process can make the operation of the system even slower.

Prior art systems typically include a sensor for acquiring imaging information, then process that information "off-chip" relative to the sensor, which requires large amounts of data to be transferred between them, further slowing down the development of a useful image.

There is a need for improved EDOF techniques to create an efficient, fast, high resolution system for producing detailed, in-focus and true color images and/or measurements of objects.

SUMMARY OF THE EMBODIMENTS

In a first aspect, method of on-chip processing to obtain an EDOF image combines interferometry and imaging so the two operations do not interfere with one another but, rather, work together to create an in-focus, true color image of a three-dimensional object. This image has no significant artifacts and requires only limited processing. In addition, a coarse depth map is created in the process which may also be helpful in subsequent usage of the acquired image. On-chip processing may be provided in complementary metal-oxide-semiconductor (CMOS) devices where analog and/or digital processing circuits are integrated with each pixel of the imager. As used herein, "on-chip processing" may encompass a variety of ways of forming imaging pixels and circuitry on a substrate or substrates formed in an integrated circuitry package.

In a second aspect, an EDOF imager is formed in CMOS with an on-chip pixel-array sensor for detecting and processing interference fringes at a pixel level.

DETAILED DESCRIPTION OF THE EMBODIMENTS

In embodiments, an on-chip signal processing method and pixel-array sensor performs high speed processing on interference fringes generated by a white light interferometer (WLI). In embodiments, using WLI with a pixel-array sensor as described herein allows the areas of best focus to become obvious and easy to find for each pixel and thus, allows the pixel-array sensor to ignore lots of out-of-focus pixels and data that will not be used in a final image. Processing interference fringes on-chip also avoids the bottleneck effect that occurs from serially transferring data off a sensor to another device such as a field programmable gate array (FPGA) or central processing unit (CPU), which often limits the speed of systems. On-chip processing may be provided in complementary metal-oxide-semiconductor (CMOS) devices where analog and/or digital processing circuits are integrated with each pixel of the imager. As used herein, "on-chip processing" may encompass a variety of ways of forming imaging pixels and circuitry on a substrate or substrates formed in an integrated circuitry package.

Figure 1:
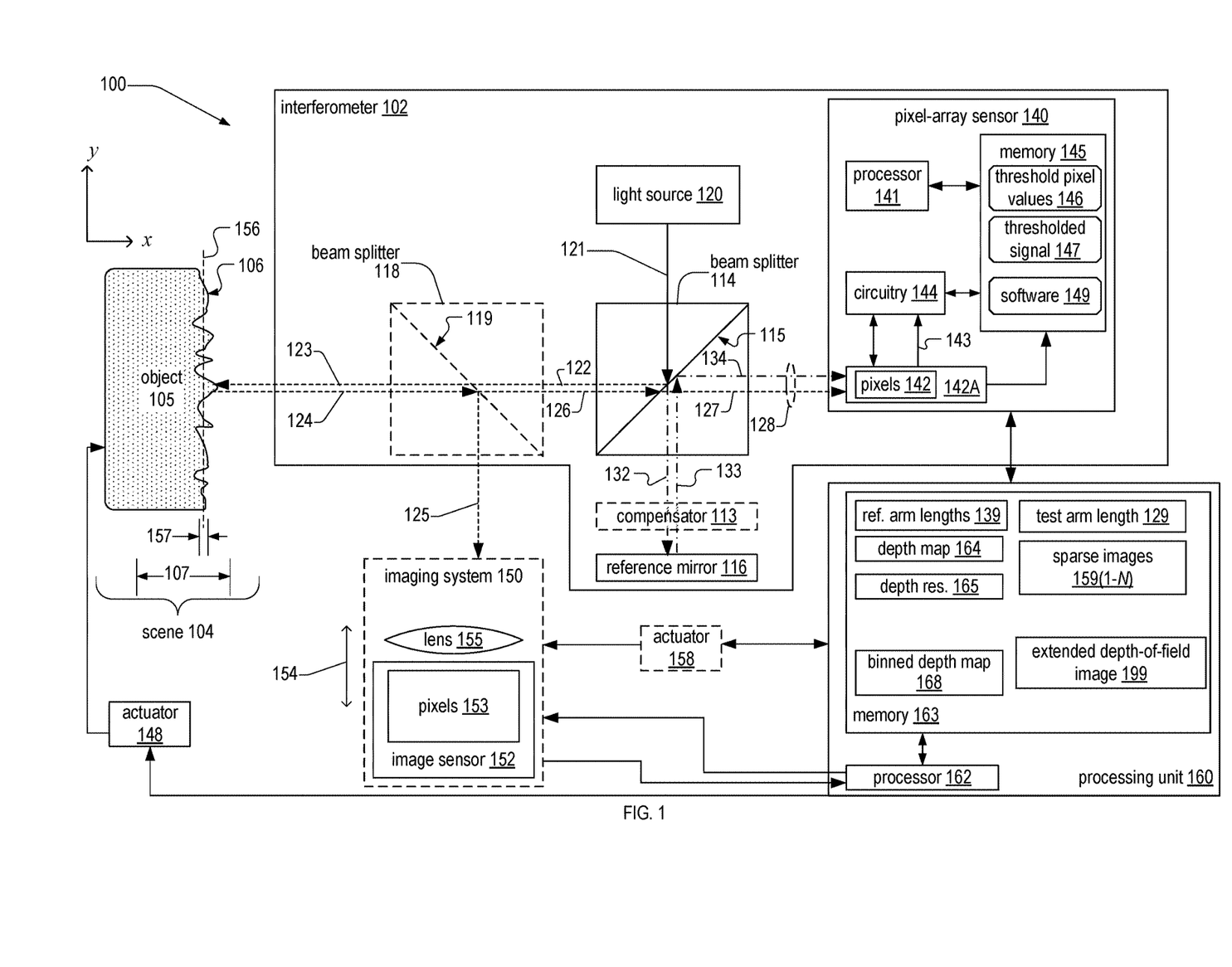
FIG. 1 is a schematic block diagram of an extended depth-of field (EDOF) imager, in an embodiment.

FIG. 1 is a schematic block diagram of an extended depth-of-field (EDOF) imager 100, in embodiments. EDOF imager 100 includes at least one of an interferometer 102, an imaging system 150, and a processing unit 160. Interferometer 102 also includes pixel-array sensor 140 for receiving and processing interference fringes. In FIG. 1, EDOF imager 100 is configured to capture an extended depth-of-field image 199 of an object 105 in a scene 104 in the field of view of imaging system 150.

Figure 3A:
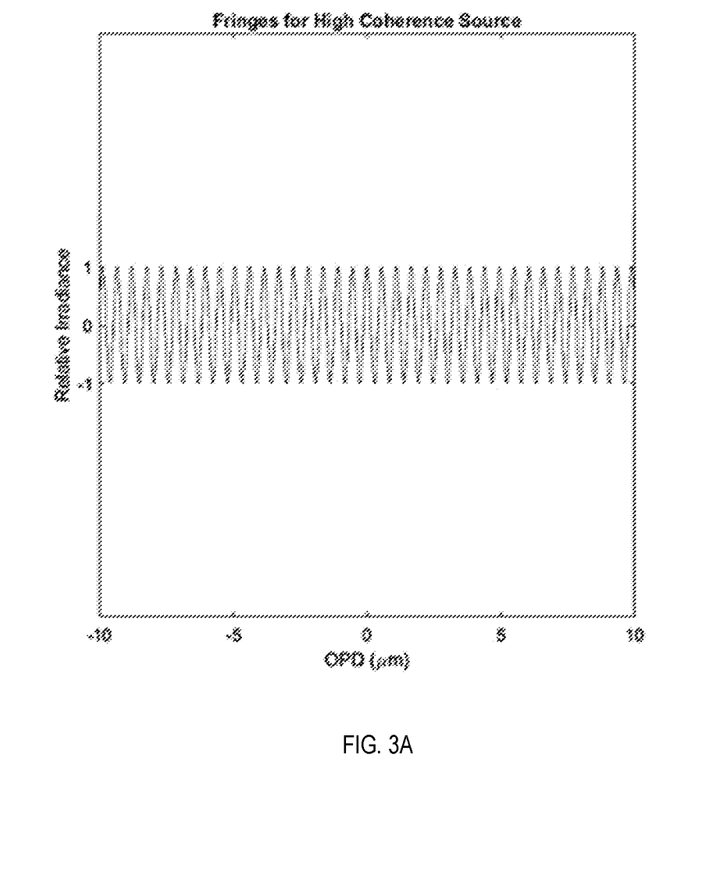
FIGS. 3A and 3B are plots illustrating the appearance of fringes at different optical path difference (OPD) values for high (3A) and low (3B) coherence sources.
Figure 3B:
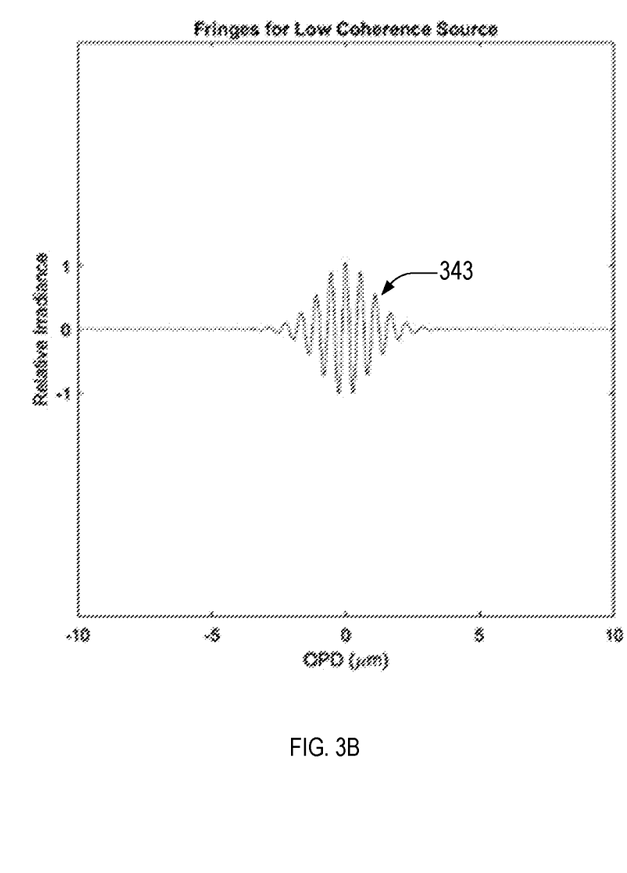

FIGS. 3A and 3B are plots illustrating interference fringes for high and low coherence sources. Optical path difference (OPD) in μm is plotted verses relative irradiance. Interferometer 102 may be used to detect the best focus locations of object 105 wherein surface 106 has a varying height profile. When a spectrally narrow, highly coherent source such as a laser is used in an interferometer, many fringes are created for a large range of OPDs as shown in FIG. 3A. Conversely, white light sources create fringes only when the OPD is close to zero, as shown by interference signal 343 of FIG. 3B. "White light" need not appear white, but rather describes any spectrally broad, low coherence source. This result is due to the low coherence of the source, such that with a large OPD, one obtains the standard incoherent irradiance. Using white light is useful in that fringes are visible over a much smaller OPD range and thus, there is less ambiguity in the zero OPD location. Zero OPD corresponds to best focus, so a white light interferometer may be used to find best focus locations over an object with a discontinuous or steep height variations.

In embodiments, pixel-array sensor 140 includes a pixel array 142A of pixel-array sensor 140 for detecting interference fringes. The fringes are most simply understood if considered at the pixel level. Each pixel's fringe structure location in depth depends on its corresponding object height at that pixel location. The fringe structure shows how the irradiance on each pixel changes as the location of focus changes as the interferometer scans vertically. If the interferometer is out of focus, typically by more than a micron or two, for a given pixel, the irradiance will be the pixel's steady incoherent level (represented as "0" in the vertical scale plots in FIGS. 3A and 3B). As the interferometer approaches focus for a pixel, fringes appear, which is seen as sudden decreases and increases in the irradiance. The amplitude of these fluctuations increases until it is maximized at the best focus location, and then the amplitude decreases again, until it returns to the steady, incoherent level.

Figure 4:
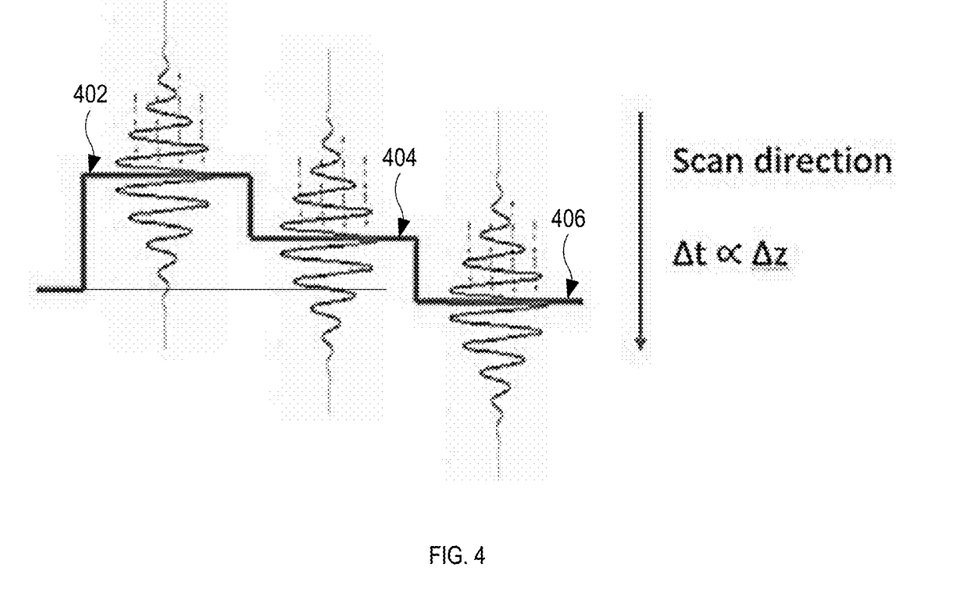
FIG. 4 is a plot illustrating white light fringes as they appear for objects with a surface of different depths, in embodiments.

FIG. 4 is a plot illustrating white light fringes as they appear for objects with a surface of different depths 402, 404 and 406, in embodiments. The line connecting depths 402, 404 and 406 represents a static object with the fringes appearing in depth as one scans. The fringes in FIG. 4 are similar to interference signal 343 of FIG. 3B, but have been turned sideways to show how the fringe structure changes with depth. The irradiance changes on a point-by-point basis based on the depth of the object surface at that point. This result is visualized with the same fringe structure occurring at different points on an object, but at different depths (equivalent to different times during scanning) based on the height of that point on the object. It is important to note the exact width of the fringe pattern (and the depth around focus where fringes will occur) is related to the source bandwidth, which is easily tailored based on the needs of the specific application.

Components of EDOF imager 100 will be discussed, followed by a description of its operation.

Interferometer 102

Interferometer 102 includes light source 120, beam splitter 114, reference mirror 116, and pixel-array sensor 140. In embodiments, a second beam splitter 118 is added to the test arm of interferometer 102 to create an imaging path 125 to imaging system 150. If used, beam splitter 118 introduces different optical properties between the two arms of interferometer 102. To compensate for dispersion and optical path length changes imposed by beam splitter 118, a compensator 113 is included between beam splitter 114 and reference mirror 116, in this embodiment. Compensator 113 may be formed from the same material and dimensions as beam splitter 118 to it has the same effect on OPD and dispersion characteristics as those caused by beam splitter 118.

In embodiments, light source 120 includes a Kohler illumination source, and input light beam 121 is Kohler illumination that completely and uniformly illuminates surface 106 of object 105. In embodiments, light source 120 is a low-coherence source, for example, light beam 121 may have a coherence length of less than ten micrometers. Examples of light source 120 include a tungsten lamp, a mercury lamp, a continuous-output xenon lamp, a superluminescent diode, and any combination thereof.

Beam splitters 114 and 118 include respective beam-splitting interfaces 115 and 119. In embodiments, interfaces 115 and 119 may be a surface with a coating so that a portion of the light striking the surface is transmitted and a portion is reflected. Coatings for beam-splitting interfaces 115 and 119 may be chosen to allow enough light to reach imaging system 150 while maintaining a high fringe contrast. Coatings are characterized in terms of transmission and reflection. In embodiments, selection of coatings may consider factors such as a ratio between the arms of the interferometer and the amount of light sent to imaging system 150. For interface 115 of beam splitter 114, a coating with 50/50 ratio of transmission to reflection may be used, for example.

In embodiments including beam splitter 118, the choice of coating for interface 119 and compensator 113 may depend on the intended application of EDOF imager 100 Considerations in choosing a coating include the comparative reflectivity of surface 106 and reference mirror 116, for example. In general, characteristics of typical objects 105 being measured by the system will influence the best coating for interface 119.

Light source 120 is selected to uniformly illuminate both object 105 and the reference arm of interferometer 102 so that characteristics of the fringes and final image come from object characteristics, such as surface 106, rather than lighting conditions. Further, light source 120 should be sufficiently bright so that pixel-array sensor 140 is able to detect fringes and imaging system 150, if used, is able to form a clear image of object 105.

Pixel-array sensor 140 receives interference signal 128 at pixels 142, which form a pixel array 142A. Pixels 142 are individual sensors receive light information and convert it into an illumination signal 143 that is sent to circuitry 144 for on-chip processing. In embodiments, other components of pixel-array sensor 140 include memory 145 and processor 141 communicatively coupled to memory 145. Processor 141 may be configured to execute computer-readable instructions of software 149.

In embodiments, circuitry 144 includes at least one of a comparator, a differential amplifier, a half-wave rectifier, and a full-wave rectifier. In embodiments, pixel-array sensor 140 is a CMOS sensor, such as a CMOS image sensor. In embodiments, memory 145 is configured to store pixel values output from pixel array 142A, and circuitry 144 is configured to process time-series signals generated by one or more pixels 142. In embodiments, memory 145 stores a plurality of threshold pixel values 146 and a thresholded signal 147. Memory 145 may also store software 149.

Memory 145 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof).

Imaging System 150

In embodiments, all processing to acquire an image of object 105 is performed in pixel-array sensor 140. As will be explained in more detail below, pixel-array sensor 140 collects the initial image that is used as a threshold for subsequent processing. However, in other embodiments, an extra beam splitter 118 and imaging system 150 may be provided as shown in FIG. 1. Imaging system 150 may then be used to collect a thresholding image.

Imaging system 150 collects a true color, in-focus image of surface 106 from imaging path 125 from beam splitter 118. Locating imaging system 150 at this position, such that it is separate from interferometer 102, means that interference between the test and reference arms of the interferometer 102 does not impact the final image. A further benefit of using a separate imaging arm is that the spectrum selected for light source 120 may be flexible as long as it is "white light." Irradiance does not change quickly for imaging system 150, but appears as any typical image does on a sensor: certain parts will be in focus while other parts are defocused, and the image will change while scanning so different parts come into focus.

Imaging system 150 includes a lens 155 and an image sensor 152. Image sensor 152 has a plurality of pixels 153, which may be part of an image-sensor pixel array. In embodiments, imaging system 150 is a camera. Object 105 has a non-flat surface 106 such that a distance from surface 106 to image sensor 152 varies along at least a direction y denoted in FIG. 1. Imaging system 150 may be configured to vary at least one of (i) a distance between image sensor 152 and lens 155 and (ii) a distance between image sensor 152 and interface 119 as indicated by arrow 154. Together, these movements change a location of an in-focus object plane 156. In embodiments, in-focus object plane 156 may, in response to said variation of distances, span an extended depth-of-field 107 (EDOF 107) that exceeds a depth-of-field 157 of imaging system 150 such that imaging system is able to collect pixels at their corresponding in-focus positions to create a fully in-focus image of surface 106. EDOF 107 is, for example, more than three times that of depth-of-field 157.

Processing Unit 160

Processing unit 160 includes a processor 162 communicatively coupled to a memory 163. Processing unit 160 is also communicatively coupled to both pixel-array sensor 140 and imaging system 150. Memory 163 stores at least one of a depth map 164, a depth resolution 165, a binned depth map 168, a plurality of sparse images 159, and EDOF image 199. In embodiments, depth resolution 165 is less than a depth of field 157 of imaging system 150.

In embodiments, memory 163 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 163 may be integrated into processor 162.

Other Components of EDOF Imager 100

In embodiments, EDOF imager 100 includes one or more actuators for moving components in the process of scanning an object. Actuator 148 may be controlled to linearly translate object 105 in the x or y direction as shown. In embodiments including imaging system 150, EDOF imager 100 may also include an actuator 158 configured to perform at least one of (a) linearly translating imaging system 150 and (b) changing a distance between lens 155 and image sensor 152, as shown by arrow 154. Both actuators 148 and 158 may be controlled by processing unit 160 although they may also receive control signals from other processing devices (not shown) used with EDOF imager 100.

Light source 120 emits an input optical beam 121, which beam splitter 114 splits, at interface 115, into a test beam 122 and a reference beam 132. Reference mirror 116 retro-reflects reference beam 132 back to beam splitter 114 as reflected beam 133, which interface 115 reflects as reflected beam 134.

Test beam 122 is transmitted by interface 119 as test beam 123, which surface 106 reflects as test beam 124 toward interface 119. In embodiments, test beam 124 is reflected by interface 119 as imaging path 125, which is incident on image sensor 152. Interface 119 transmits test beam 124 as test beam 126, part of which is then transmitted by beam splitter 114 as test beam 127, and incident on pixel-array sensor 140.

In embodiments, beams 127 and 134 are co-propagating, e.g., such that their respective centers are collinear, and form an interference signal 128. Interference signal 128 exhibits spatial and temporal intensity variation resulting from interference between beams 127 and 134, thus forming interference fringes. Beams 127 and 134 are illustrated as non-overlapping for clarity of illustration. Pixel-array sensor 140 converts interference signal 128 into an signal 143. Signal 143 is sent to circuitry 144, either directly from pixel array 142A or via memory 145. In embodiments, signal 143 is a time series of pixel values, averaged pixel values, from an m×n pixel subarray of pixels 142, where integers m and n are greater than or equal to one.

In embodiments, imaging system 150 may be configured to move object plane 156 by varying a distance between image sensor 152 and lens 155. Actuator 158 may be configured to move object plane 156 by at least one of moving imaging system 150 and changing a distance between image sensor 152 and lens 155. In embodiments, memory 163 stores a total optical path length travelled by beams 122, 123, 124, and 125 as a test-arm length 129, which may vary in time, e.g., via actuator 158's translating imaging system 150 along the propagation direction of beam of imaging path 125.

In embodiments, memory 163 stores a total optical path length travelled by beams 132, 133, and 134 as one of a plurality of reference-arm lengths 139. Each reference-arm length 139 corresponds to a respective total optical path length travelled by beams 132, 133, and 134 at difference configurations of pixel-array sensor 140 corresponding to positions of pixel-array sensor 140 along the propagation direction of beam 134, which actuator 148 is configured to change.

Implementation

The simplest processing of interference fringes is a threshold-type operation at the incoherent light level. An example threshold would not output anything for illuminations at or below the incoherent light level, which means the system records only constructive interference.

In embodiments, performing image processing steps "on-chip" (e.g., pixel-array sensor 140) is faster than outputting image data at each scan depth for postprocessing. In embodiments, processing occurs on the pixel-array sensor 140 to manipulate the raw signal 143 into its desired form. Pixel-array sensor 140 includes circuitry 144 to transform the data from each pixel without sending the signal off-chip to an external device such as processing unit 160 which many include, for example, a field programmable gate array (FPGA) or central processing unit (CPU).

Figure 5:
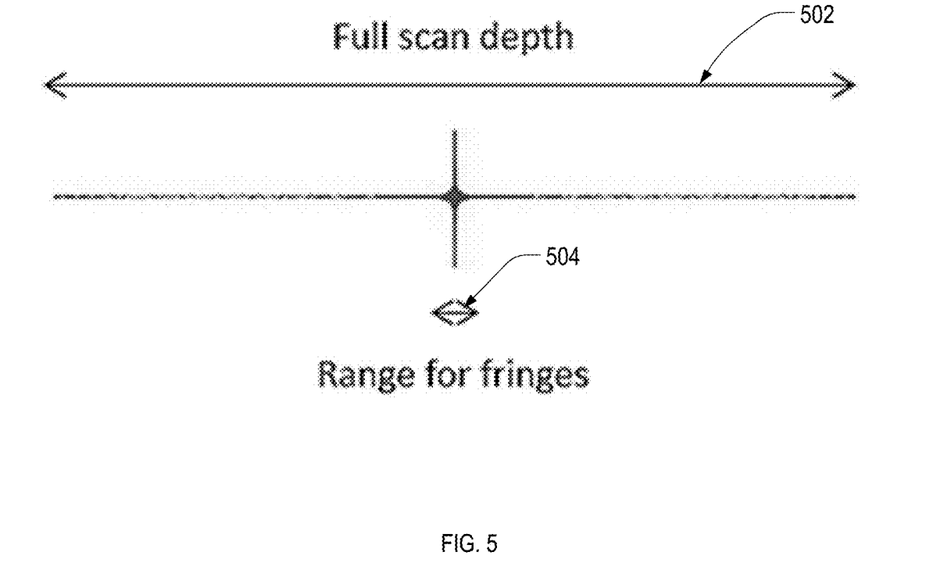
FIG. 5 is a plot illustrating a comparison of a full scan range (500 μm) vs. the narrow range for fringes to occur (a few μm), in an embodiment.

Additionally, for most scan depths, a pixel is out-of-focus and simply at its incoherent light level which adds no information for the final image. FIG. 5 is a plot illustrating a comparison of a full scan range of approximately 500 µm at 502 vs. the narrow range 504 for fringes to occur (a few µm), in an embodiment. If these types of measurements outside narrow range 504 are ignored and never outputted, rather than outputted and then thrown away, the system speed and efficiency may increase significantly.

Figure 2:
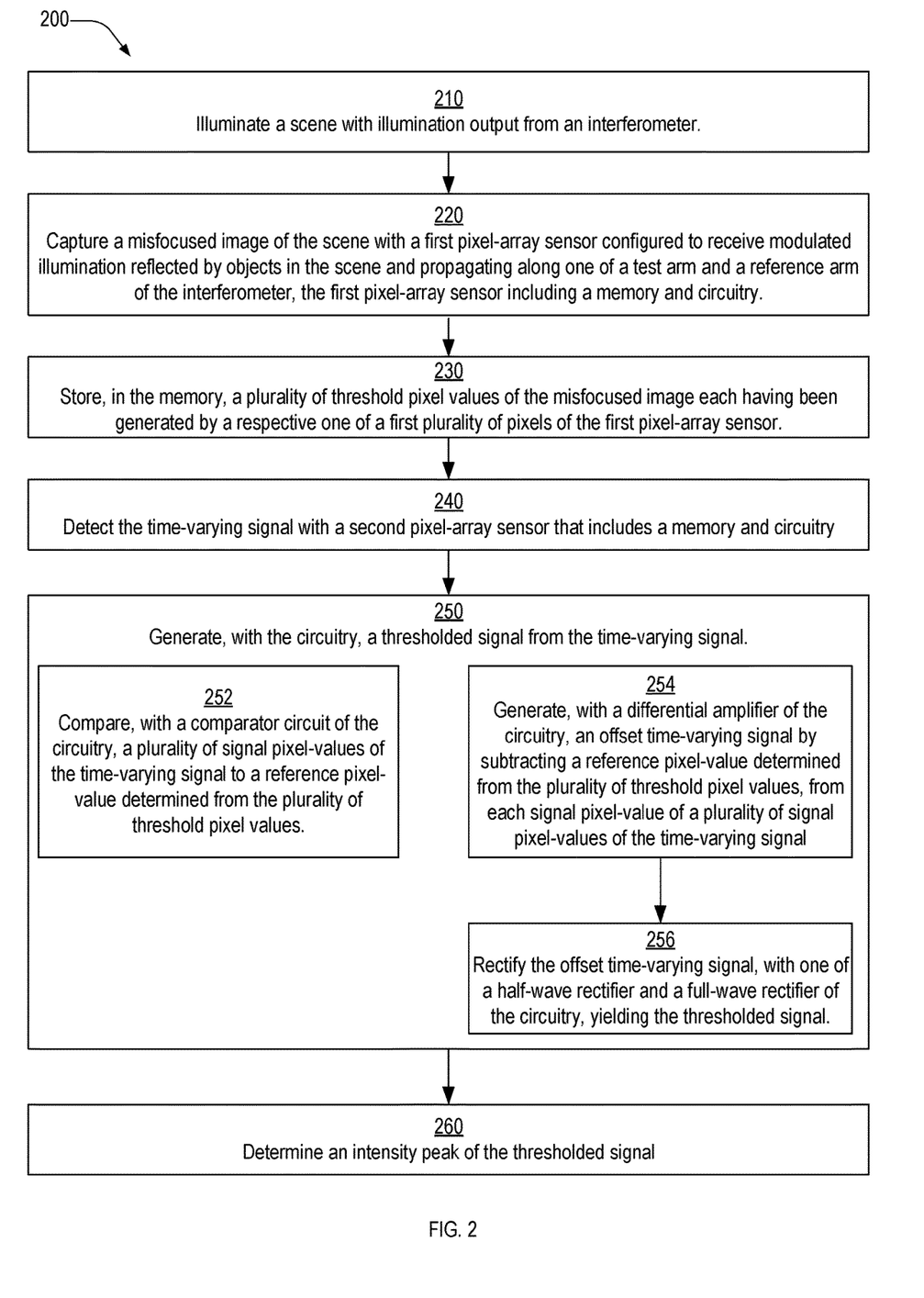
FIG. 2 is a flowchart illustrating a method for processing an illumination signal, in embodiments.

FIG. 2 is a flowchart illustrating a method 200 for processing a illumination signal using a thresholding operation. Method 200 includes at least one of steps 210, 220, 230, 240, 250, and 260. Method 200 may be implemented within one or more aspects of EDOF imager 100.

Step 210 includes illuminating a scene with illumination output from an interferometer. In an example of step 210, light source 120 illuminates scene 104 with beam 123 output from interferometer 102.

Step 220 includes capturing a defocused image of the scene with a first pixel-array sensor configured to receive modulated illumination reflected by objects in the scene and propagating along one of a test arm and a reference arm of the interferometer. In an example of step 220, pixel-array sensor 140 captures a defocused image of object 105 by detecting the incoherent combination of beam 127 and beam 134. In a further example of step 220, image sensor 152 captures a defocused image of object 105 by detecting beam of imaging path 125. Image sensor 152 is an example of a pixel-array sensor since it includes a pixel array. In each of these examples, the defocused image may be captured when object plane does not intersect any part of surface 106 of object 105, i.e. anywhere in in EDOF 107 of FIG. 1.

In embodiments of step 220, the captured misfocused image is recorded as a threshold frame is recorded and saved on-chip, e.g., as threshold pixel values 146 to achieve on-chip processing of interference fringes, A somewhat out of focus, incoherent image is captured before the depth scan occurs. A global threshold would not be representative of each pixel and therefore degrade image sharpness as embodiments of EDOF imager 100 operate for any general object with features of varying brightness/reflectivity, which need their own unique threshold. The pixel illumination is not expected to significantly change from the stored incoherent illumination value until close to the zero OPD condition. Some amount of variation may occur in the incoherent illumination region due to defocus and blur from neighboring pixels, so the thresholding may be set to an illumination slightly greater than the collected reference image's illumination to avoid reading any pixels before reaching their near zero OPD condition.

Step 230 includes storing, in the memory, a plurality of threshold pixel values of the defocused image each having been generated by a respective one of a first plurality of pixels of the first pixel-array sensor. In an example of step 230, memory 145 stores threshold pixel values 146 of the misfocused image captured in step 220. This image serves as threshold on a pixel-by-pixel basis.

Step 240 includes detecting a signal with a second pixel-array sensor that includes a memory and circuitry. In an example of step 230, pixel-array sensor 140 detects interference signal 128 and circuitry 144 receives signal 143.

Figure 6A:
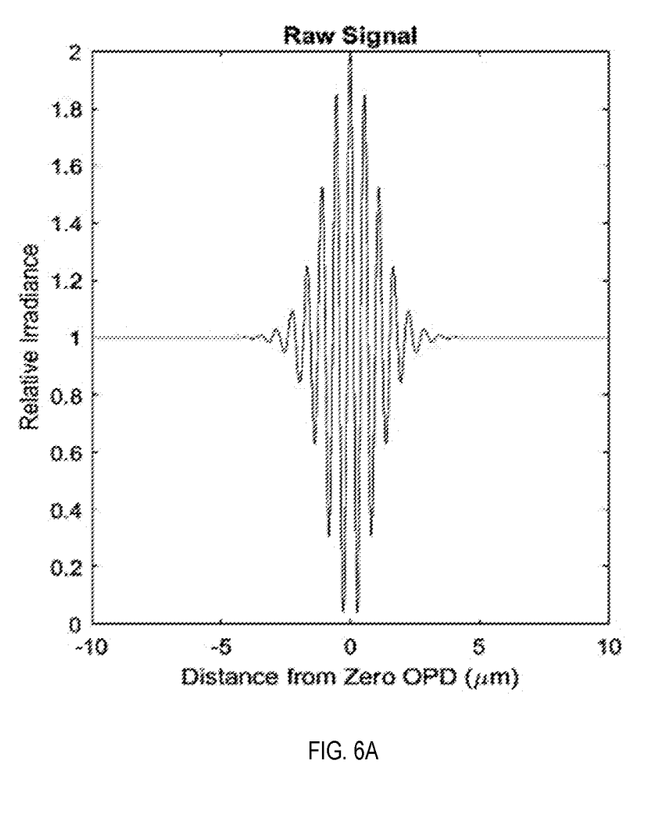
FIGS. 6A and 6B are plots illustrating a transformation of a raw fringe signal in FIG. 6A to a thresholded signal in FIG. 6B, where illumination below the incoherent level is set to zero, in embodiments.
Figure 6B:
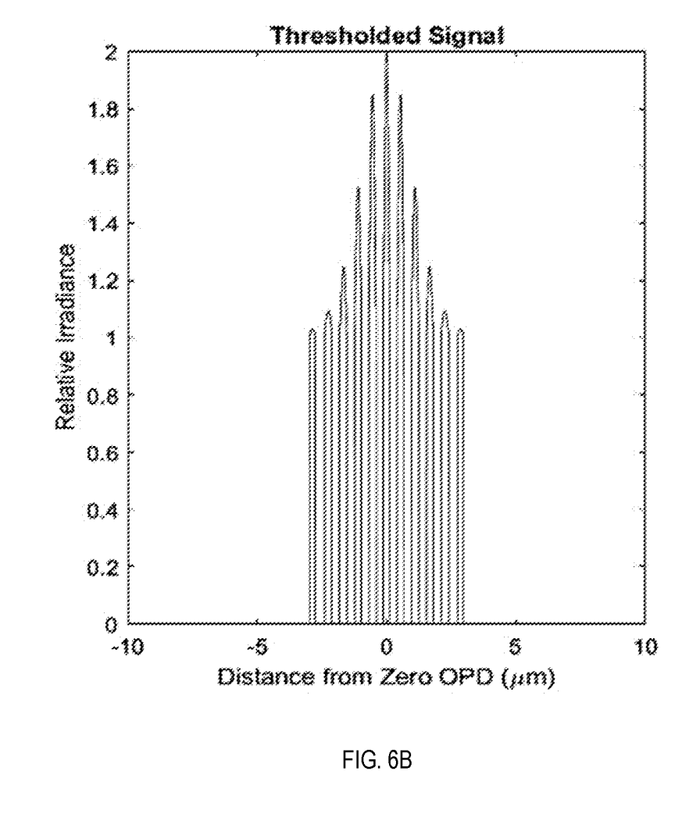

Step 250 includes generating, with the circuitry, a thresholded signal from the signal. In an example of step 250, circuitry 144 generates thresholded signal 147 from the signal detected by pixel-array sensor 140. In embodiments, step 250 employs a thresholding scheme, as previously described, such that irradiance values at or below the incoherent level are ignored, and values above the incoherent level are maintained to create the signal. FIGS. 6A and 6B are plots illustrating a transformation of a raw fringe signal in FIG. 6A to a thresholded signal in FIG. 6B, where illumination below the incoherent level is set to zero, in embodiments. Values output by the pixel array sensor which may be understood as a photovoltage, a photocurrent, or a digital pixel value.

Step 250 may include step 252. Step 252 includes comparing, with a comparator circuit of the circuitry, a plurality of signal pixel-values of the signal to a reference pixel-value determined from the plurality of threshold pixel values. In an example of step 252, a comparator of circuitry 144 compares a plurality of pixel values of signal 143 with to a reference pixel-value determined from one or more threshold pixel values 146.

In embodiments, step 250 is implemented at the pixel level, that is, for each pixel 142. In such embodiments, each required circuit element of circuitry 144 may be implemented by one or more transistors, for example, of an integrated circuit. In embodiments, other circuitry elements may be used to create a more robust circuit that is less susceptible to error.

Step 250 may include steps 254 and 256. Step 254 includes generating, with a differential amplifier of the circuitry, an offset signal by subtracting a reference pixel-value determined from the plurality of threshold pixel values, from each signal pixel-value of a plurality of signal pixel-values of the illumination signal. In an example of step 254, a differential amplifier of circuitry 144 generates an offset signal by subtracting a reference pixel-value, determined from threshold pixel values 146, from signal 143.

Step 256 includes rectifying the offset illumination signal, with one of a half-wave rectifier and a full-wave rectifier of the circuitry, yielding the thresholded signal. In an example of step 256, a rectifier of circuitry 144 rectifies the offset illumination signal, to yield thresholded signal 147.

When step 256 employs a full-wave rectifier, the rectifier may use an absolute function value (absolute value of the signal, for example) to include temporal modulation of optical power resulting from destructive interference in the processed signal. This is useful when smaller signals occur when contrast ratio of the fringes decreases, since more of the fringe signal will be recorded in these cases as compared to output of the half-wave rectifier.

Step 260 includes determining an intensity peak of the thresholded signal. In an example of step 260, processor 141 executes machine-readable instructions of software 149 to determine an intensity peak of thresholded signal 147.

Figure 7:
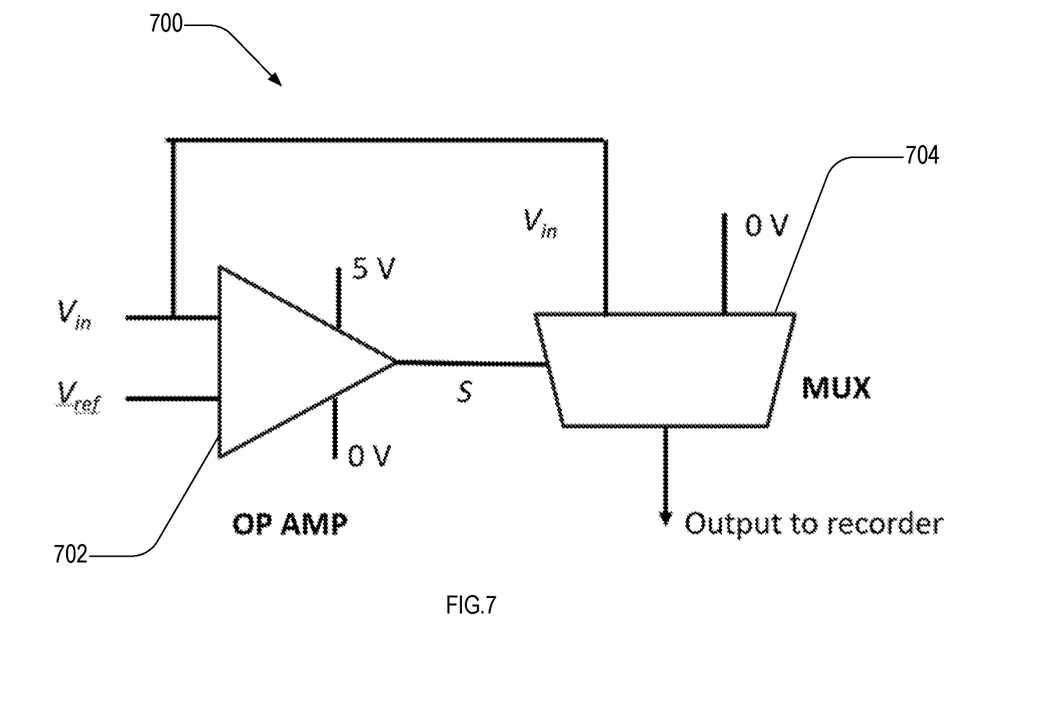
FIG. 7 is a schematic illustration showing a thresholding circuit, in embodiments.

The thresholding operation of step 250 may be implemented by circuitry 144 in several ways. FIG. 7 is a schematic illustration of a thresholding circuit 700 for implementing step 252 of method 200. In embodiments, circuitry 144 of FIG. 1 includes circuit 700. A comparator 702 receives an input signal from the pixel ($V_{in}$) and a stored incoherent signal ($V_{ref}$) corresponding to that pixel. The output (S) of the comparator is high voltage if the input signal $V_{in}$ is above threshold value $V_{ref}$ and is low voltage if input signal $V_{in}$ is at or below threshold signal $V_{ref}$. The output S of the comparator is then used as the selector in multiplexer 704. If the selector value S is high, the first input $V_{in}$ is chosen as the output. If the selector value is low, the second input (0 V) is outputted.

Figure 8:
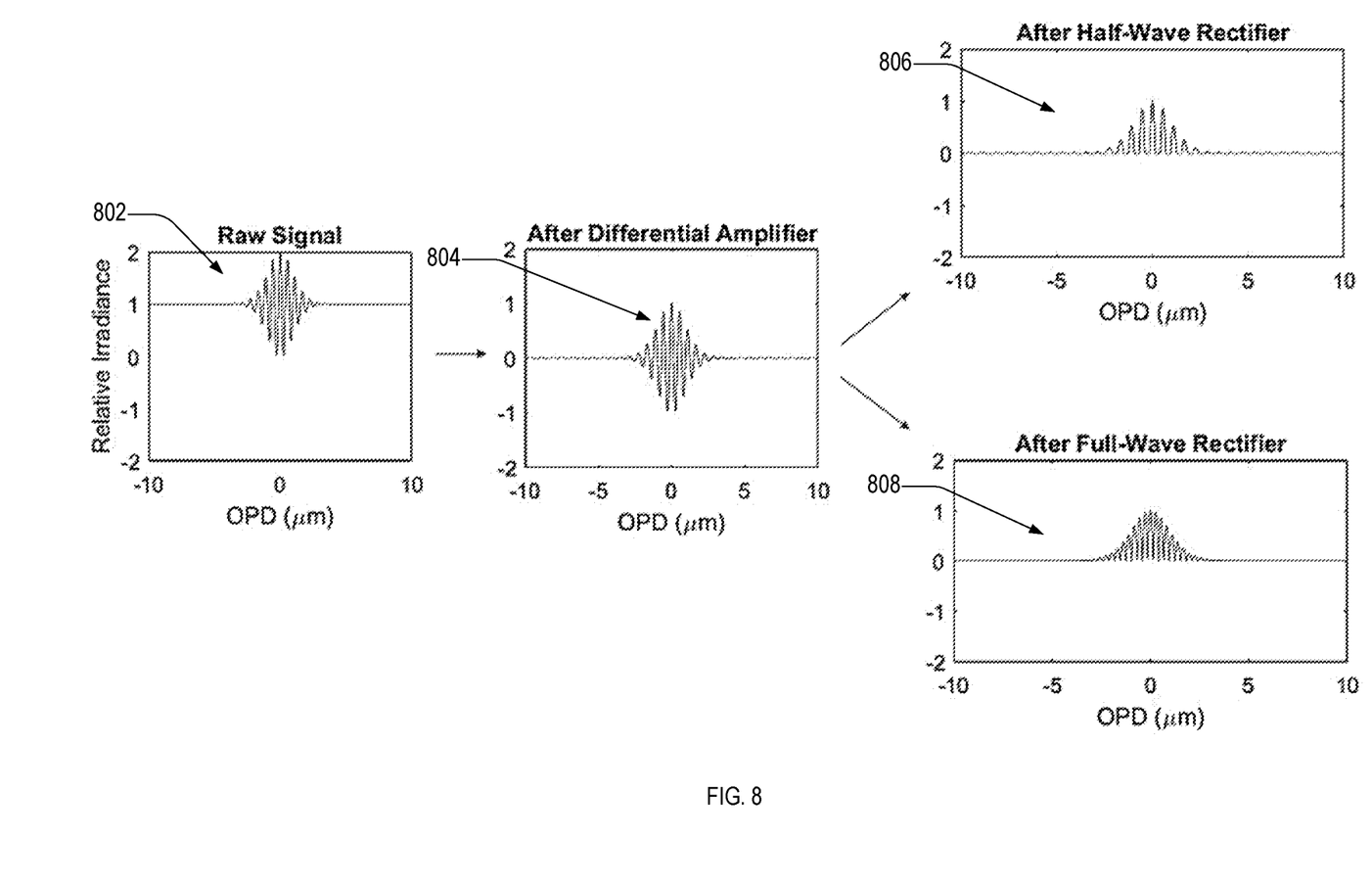
FIG. 8 is a set of plots illustrating a transformation of raw fringe signal to a thresholded signal using a differential amplifier and a rectifier, either half-wave or full-wave, in embodiments.

In embodiments, method 200 may alternatively process signal 143 according to steps 254 and 256, in a threshold-like way using a differential amplifier and either a half-wave or full-wave rectifier. FIG. 8 is a set of plots illustrating this process of transforming raw fringe signal 802 to a thresholded signal using a differential amplifier 804 and a rectifier, either half-wave signal 806 or full-wave signal 808. The outputted signals 806, 808 for these methods differ from the previously described method, since they transform the fringes in a different way. The half-wave rectifier method outputs a signal 806 that is similar to the output signal of FIG. 6B with the incoherent light level subtracted. The full-wave rectifier does this as well, but also flips the destructive interference to positive values to contribute to the signal as shown in 808.

Figure 9:
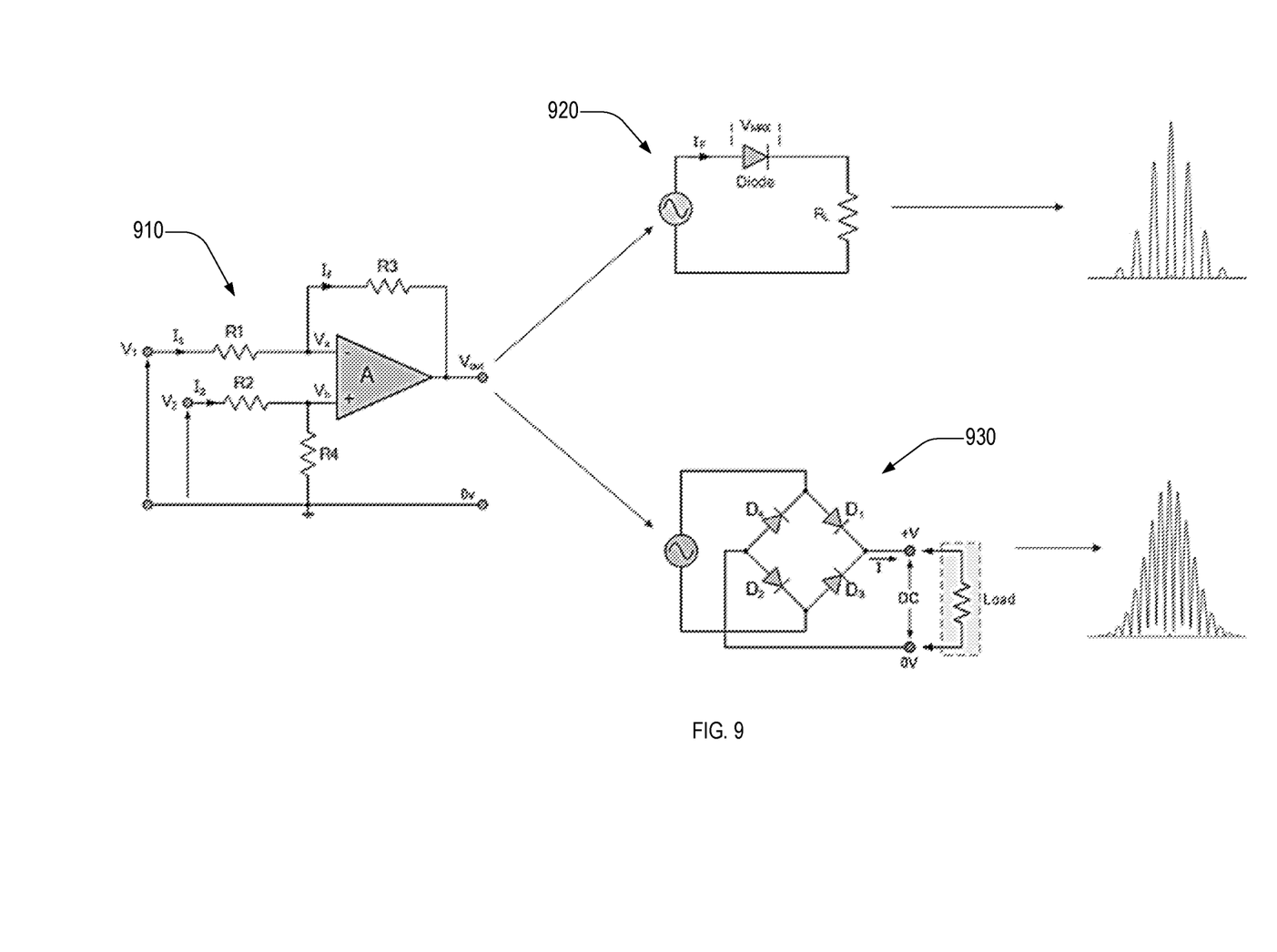
FIG. 9 is a schematic illustration of a differential amplifier providing input to either a half-wave rectifier or a full-wave rectifier circuit to process the fringes, in embodiments.

In embodiments, circuitry 144 of FIG. 1 is shown in more detail in FIG. 9. In an embodiment, a differential amplifier 910 subtracts the stored incoherent irradiance from the current pixel illumination value. Stored incoherent irradiance may also be understood as a photovoltage, a photocurrent, or a digital pixel value. For one method, the output of the differential amplifier may be input to a half-wave rectifier 920 which causes any input values at or below zero to be set to zero. So, only the positive parts of the fringes are saved, providing an output shown in FIG. 9 corresponding to the output also shown at 806 in FIG. 8. For another method, the output of differential amplifier 910 is inputted into a full-wave rectifier 930 which outputs the absolute value of the signal rather than setting a threshold, providing an output shown in FIG. 9 corresponding to the output also shown at 808 in FIG. 8.

As illustrated in FIG. 9, circuitry 144 may include, for example, differential amplifier 910 which provides an input to either half-wave rectifier 920 or full-wave rectifier 930. Circuitry 144 may include, for each pixel 142, at least one of (i) a respective differential amplifier 910, (ii) a respective half-wave rectifier 920, and (iii) a respective full-wave rectifier 930. Pixel array 142A includes M1 rows and M2 columns of pixels. Circuitry 144 may include, for each of either the M1 rows or M2 columns, (i) a respective differential amplifier 910, (ii) a respective half-wave rectifier 920, and (iii) a respective full-wave rectifier 930.

Embodiments of each of the methods described above transform the signals to record information (e.g., features of temporally modulated optical power resulting from interference) from the white light fringes while ignoring incoherent light. When any of the circuits of FIG. 7 or 9 are implemented on-chip, EDOF imager 100 may include a summing operation during the scanning, for example, by adding all the constructive interference and/or adding the additive inverse of the fringe signal to include the destructive interference for each pixel over the entire scan depth. The peak of the constructive interference is perfect focus, and the signal on either side of focus is near perfect focus. The recorded fringe signal occurs for such a narrow OPD range that it is within the inherent depth of field of the optical system and does not reduce system resolution. In embodiments, EDOF imager 100 has a depth of field that is greater than or equal to a longitudinal spatial width (e.g., FWHM, 1/e, $1/e^2$) of an envelope of the interference signal, the benefit of which is to avoid too much defocus of the fringes in extended depth-of-field image 199.

In embodiments, the system and method described above combine interferometry and imaging so the two operations do not interfere with one another but, rather, work together to create an in-focus, true color image of a three-dimensional object. This image has no significant artifacts and requires only limited processing. In addition, a coarse depth map is created in the process which may also be helpful in subsequent usage of the acquired image. CMOS sensors are likely to continue to implement processing at the pixel level and do so on larger and larger sensors. The framework of the system allows for quick, detailed and true color measurements of objects to be collected. Such a framework may be applied, for example, to in-line inspection of many materials, such as semiconductor components, pharmaceuticals, and other small and detailed objects that require stringent quality control. The system may extend beyond in-line inspection as well, and it could be a valuable tool in many machine vision applications, medicinal applications and in lab settings, for example, with biological samples which must be captured quickly.

Combinations of Features

Features described above as well as those claimed below may be combined in various ways without departing from the scope hereof. The following enumerated examples illustrate some possible, non-limiting combinations:

(A1) A method for generating an in-focus image of a scene on a pixel-array sensor includes receiving a defocused image of the scene by the pixel-array sensor; storing, in a memory of a pixel-array sensor, the defocused image as plurality of threshold pixel values; detecting interference fringes from the scene at a plurality of scan depths by a pixel-array in the pixel-array sensor to generate a plurality of detected pixel-values; processing, with circuitry on the pixel-array sensor, the plurality of detected pixel-values with the plurality of threshold pixel values to generate a thresholded signal for each pixel; and outputting the in-focus image according to the thresholded signals.

(A2) In method (A1), the defocused image is generated by illuminating the scene by an optical beam propagating along a test arm of an interferometer and the defocused image is captured by the pixel-array.

(A3) In method (A1), the defocused image is generated by illuminating the scene by an optical beam propagating along a test arm of an interferometer and the defocused image is captured by an imaging system.

(A4) In any of method (A1)-(A3), processing the plurality of detected pixel-values includes comparing detected pixel-values to a corresponding threshold pixel-values of the plurality of threshold pixel values.

(A5) In any of methods (A1)-(A4), processing the plurality of detected pixel-values includes generating, with a differential amplifier of the circuitry, offset pixel-values by subtracting threshold pixel-values from corresponding pixel-values; and rectifying the offset pixel-values, with a half-wave rectifier, yielding the thresholded signal.

(A6) In any of methods (A1)-(A5), processing the plurality of detected pixel-values includes generating, with a differential amplifier of the circuitry, offset pixel-values by subtracting threshold pixel-values from corresponding pixel-values; and rectifying the offset pixel-values with a full-wave rectifier of the circuitry, yielding the thresholded signal.

(B1) A pixel-array sensor for generating an in-focus image of a scene includes an array of pixels for receiving interference fringes generated from recombining a reference beam and an optical beam reflected by objects in the scene, said interference fringes comprising an initial defocused image and a signal comprising a plurality of detected pixel-values; a memory for storing a plurality of threshold pixel values of the defocused image; and circuitry for receiving the plurality of detected pixel-values and corresponding threshold pixel value from the memory, generating a thresholded signal for each pixel and outputting the in-focus image according to the thresholded signals.

(B2) In the pixel-array sensor of (B1), the scene is illuminated by an optical beam propagating along a test arm of an interferometer using a low coherence light source.

(B3) In the pixel-array sensor of claim (B2), the interferometer may be a white light interferometer.

(B4) In any of the pixel-array sensors of (B1)-(B3), the circuitry includes a comparator for receiving detected pixel-values and corresponding threshold pixel-values and outputting a high value when the detected pixel-values is above the corresponding threshold pixel value and outputting a low value otherwise; and a multiplexer for outputting the detected pixel-values when the output of the comparator is the high value and 0 volts when the output of the comparator is the low value.

(B5) In any of the pixel-array sensors of (B1)-(B4), wherein the circuitry includes a differential amplifier for generating offset pixel-values by subtracting threshold pixel values from corresponding detected pixel-values; and a half-wave rectifier for rectifying the offset pixel-values to yield the thresholded signals.

(B6) In any of the pixel-array sensors of (B1)-(B5), the circuitry includes a differential amplifier for generating offset pixel-values by subtracting threshold pixel values from corresponding detected pixel-values; and a full-wave rectifier for rectifying the offset pixel-values to yield the thresholded signals.

(B7) In any of the pixel-array sensors of (B1)-(B6), wherein the array of pixels, the memory and the circuitry are integrated on a complementary metal-oxide-semiconductor (CMOS) substrate.

(C1) An imaging system for capturing an extended depth-of-field (EDOF) image includes an interferometer using a low coherence light source; an array of pixels for receiving interference fringes generated from recombining a reference beam and an optical beam reflected by objects in the scene, said interference fringes comprising an initial defocused image and a signal comprising a plurality of detected pixel-values; a memory for storing a plurality of threshold pixel values of the defocused image; and circuitry for receiving the plurality of detected pixel-values and corresponding threshold pixel value from the memory, generating a thresholded signal for each pixel and outputting an in-focus image according to the thresholded signals; a processing unit; and at least one actuator for controlling a position of the pixel-array sensor.

(C2) In the imaging system of (C1), an image sensor for capturing the initial defocused image of the scene.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for generating an in-focus image of a scene on a pixel-array sensor, comprising:
    receiving a defocused image of the scene by the pixel-array sensor;
    storing, in a memory of the pixel-array sensor, the defocused image as plurality of threshold pixel values;
    detecting interference fringes from the scene at a plurality of scan depths by a pixel-array in the pixel-array sensor to generate a plurality of detected pixel-values;
    processing, with circuitry on the pixel-array sensor, the plurality of detected pixel-values with the plurality of threshold pixel values to generate a thresholded signal for each pixel; and
    outputting the in-focus image according to the thresholded signals.

2. The method of claim 1, wherein the defocused image is generated by illuminating the scene by an optical beam propagating along a test arm of an interferometer and the defocused image is captured by the pixel-array.

3. The method of claim 1, wherein the defocused image is generated by illuminating the scene by an optical beam propagating along a test arm of an interferometer and the defocused image is captured by an imaging system.

4. The method of claim 1, wherein processing the plurality of detected pixel-values further comprises:
    comparing detected pixel-values to a corresponding threshold pixel-values of the plurality of threshold pixel values.

5. The method of claim 1, processing the plurality of detected pixel-values further comprises:
    generating, with a differential amplifier of the circuitry, offset pixel-values by subtracting threshold pixel-values from corresponding pixel-values; and
    rectifying the offset pixel-values, with a half-wave rectifier, yielding the thresholded signal.

6. The method of claim 1, processing the plurality of detected pixel-values further comprises:
    generating, with a differential amplifier of the circuitry, offset pixel-values by subtracting threshold pixel-values from corresponding pixel-values; and
    rectifying the offset pixel-values with a full-wave rectifier of the circuitry, yielding the thresholded signal.

7. A pixel-array sensor for generating an in-focus image of a scene, comprising:
    an array of pixels for receiving interference fringes generated from recombining a reference beam and an optical beam reflected by objects in the scene, said interference fringes comprising an initial defocused image and a signal comprising a plurality of detected pixel-values;

a memory for storing a plurality of threshold pixel values of the defocused image; and circuitry for receiving the plurality of detected pixel-values and corresponding threshold pixel value from the memory, generating a thresholded signal for each pixel and outputting the in-focus image according to the thresholded signals.

8. The pixel-array sensor of claim 7 wherein the scene is illuminated by the optical beam propagating along a test arm of an interferometer using a low coherence light source.

9. The pixel-array sensor of claim 8 wherein the interferometer further comprises a white light interferometer.

10. The pixel-array sensor of claim 7, wherein the circuitry further comprises:
a comparator for receiving detected pixel-values and corresponding threshold pixel-values and outputting a high value when the detected pixel-values is above the corresponding threshold pixel value and outputting a low value otherwise; and
a multiplexer for outputting the detected pixel-values when the output of the comparator is the high value and 0 volts when the output of the comparator is the low value.

11. The pixel-array sensor of claim 7, wherein the circuitry further comprises:
a differential amplifier for generating offset pixel-values by subtracting threshold pixel values from corresponding detected pixel-values; and
a half-wave rectifier for rectifying the offset pixel-values to yield the thresholded signals.

12. The pixel-array sensor of claim 7, wherein the circuitry further comprises:
a differential amplifier for generating offset pixel-values by subtracting threshold pixel values from corresponding detected pixel-values; and
a full-wave rectifier for rectifying the offset pixel-values to yield the thresholded signals.

13. The pixel-array sensor of claim 7, wherein the array of pixels, the memory and the circuitry are integrated on a complementary metal-oxide-semiconductor (CMOS) substrate.

14. An imaging system for capturing an extended depth-of-field (EDOF) image of a scene, comprising:
an interferometer using a low coherence light source;
a pixel-array sensor further comprising:
an array of pixels for receiving interference fringes generated from recombining a reference beam and an optical beam reflected by objects in the scene, said interference fringes comprising an initial defocused image and a signal comprising a plurality of detected pixel-values;
a memory for storing a plurality of threshold pixel values of the defocused image; and
circuitry for receiving the plurality of detected pixel-values and corresponding threshold pixel value from the memory, generating a thresholded signal for each pixel and outputting an in-focus image according to the thresholded signals;
a processing unit; and
at least one actuator for controlling a position of the pixel-array sensor.

15. The imaging system of claim 14, further comprising an image sensor for capturing the initial defocused image of the scene.

* * * * *